United States Patent
Yokota et al.

[11] Patent Number: 5,800,287
[45] Date of Patent: Sep. 1, 1998

[54] SOLID GOLF BALL

[75] Inventors: Masatoshi Yokota; Keiji Moriyama. both of Shirakawa; Mikio Yamada. Kobe. all of Japan

[73] Assignee: Sumitomo Rubber Industries, Ltd.. Hyogo-ken, Japan

[21] Appl. No.: 713,609

[22] Filed: Sep. 13, 1996

[30] Foreign Application Priority Data

Sep. 14, 1995 [JP] Japan ................... 7-236677

[51] Int. Cl.⁶ .................. A63B 37/06; A63B 37/12
[52] U.S. Cl. .................. 473/372; 473/377; 473/384
[58] Field of Search .................. 473/372, 373, 473/374, 377, 378, 383, 384

[56] References Cited

U.S. PATENT DOCUMENTS 5,601,503  2/1997  Yamagishi et al.

FOREIGN PATENT DOCUMENTS 0468101  1/1992  European Pat. Off.
2176409  12/1986  United Kingdom.
2224943  5/1990  United Kingdom.

Primary Examiner—George J. Marlo
Attorney, Agent, or Firm—Birch, Stewart, Kolasch & Birch, LLP

[57] ABSTRACT

A solid golf ball having good controllability and long flight distance which utilizes a solid core and a cover covering the core, wherein the core is formed from a rubber composition comprising a polybutadiene rubber having a cis-1,4-structure content of at least 40% and either an unsaturated carboxylic acid or a metal salt thereof or both, and the cover has a thickness of 1 to 4 mm, a Shore D hardness of 55 to 64 and has 300 to 450 dimples having a diameter of 2 to 5 mm, with the dimples having a dimple area proportion of 62 to 78% and a total dimple volume of 260 to 345 mm₃.

11 Claims, 1 Drawing Sheet

SOLID GOLF BALL

FIELD OF THE INVENTION

The present invention relates to a solid golf ball having excellent flight performance and excellent spin performance.

BACKGROUND OF THE INVENTION

Hitherto, there have been mainly produced two types of golf balls. One is a solid golf ball, such as a two piece golf ball, which comprises a core formed from vulcanized rubber material and a thermoplastic cover (e.g. ionomer cover) formed on the core. The other is a thread wound golf ball which comprises a liquid or solid center, a thread rubber winding layer formed on the center and a balata or ionomer cover formed thereon. The solid golf ball, when hit by either a driver or an iron club, flies a with parabolic trajectory and achieves a long flight distance, thus showing excellent flight performance, in comparison with the thread wound golf ball. This feature is probably brought about by its inner structure, i.e. the solid golf ball has such structural features that it does not achieve much spin and creates a parabolic trajectory which provides much run after landing on the ground thereby producing greater total flight distance.

On the other hand, when the solid golf ball is hit by an iron club it produces a so-called flies and thus, it is difficult to stop the ball on the green, because spin is not easily applied to the ball. Accordingly, professional golfers or high-level golfers dislike the flight performance of solid golf balls.

OBJECT OF THE INVENTION

Thus, a solid golf ball having good spin performance so that one can take deadly aim at the pin has been desired. In this case, the long flight distance which is an inherent characteristic of the solid golf ball would be maintained. Advantageously, the objective golf ball also has a good shot feel.

SUMMARY OF THE INVENTION

The present invention is directed to providing a solid golf ball which has good shot feel and excellent spin performance which improves controllability of the approach shot, by stopping the ball on the green, but at the same time does not adversely affect the characteristics inherent in solid golf balls, i.e. a parabolic trajectory and long flight distance. The solid golf ball of the present invention comprises a solid core and a cover covering the core, wherein the core is formed from a rubber composition comprising a polybutadiene rubber having a cis-1,4-structure content of at least 40% and either an unsaturated carboxylic acid or a metal salt thereof or the both, and the cover has a thickness of 1 to 4 mm, a Shore D hardness of 55 to 64 and has 300 to 450 dimples having a diameter of 2 to 5 mm, and the dimples have a dimple area proportion of 62 to 78% and a total dimple volume of 260 to 345 mm$^3$.

BRIEF EXPLANATION OF DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
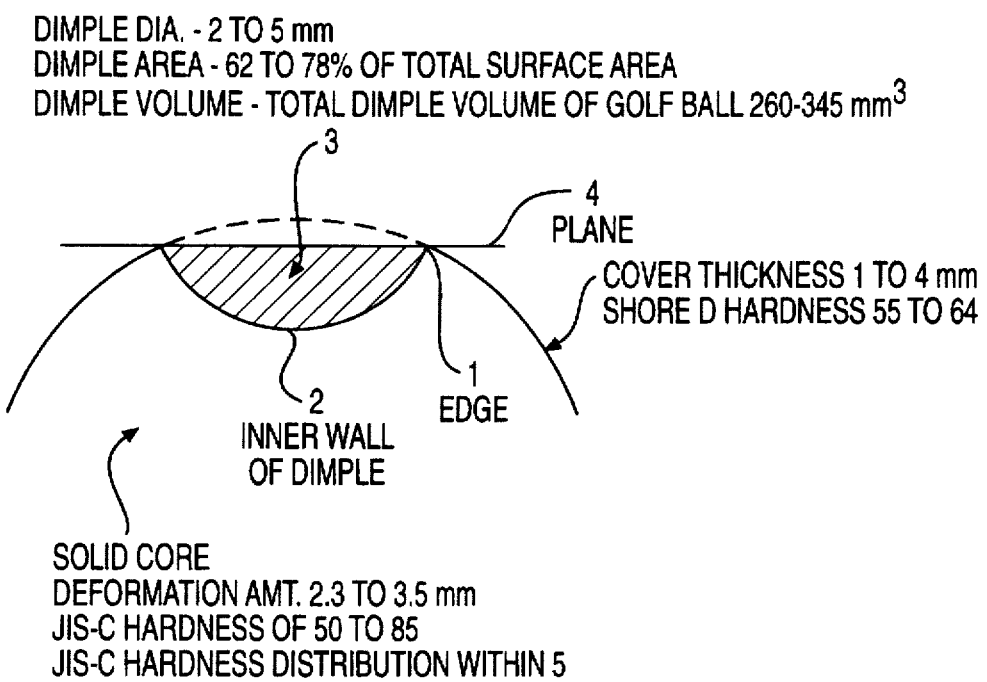
FIG. 1 is a schematic cross section illustrating one dimple of the solid golf ball of the present invention.

First of all, some mechanism of the present invention will be explained, although it is not limited thereto. When considering the mechanism for the generation of spin with golf balls, if the same materials and the same shot conditions are used and if the hardness of the golf ball is only varied, the amount of deformation of the golf ball is merely changed by the hardness of the ball, since the coefficient of friction between the golf club face and the ball surface is the same because the same materials are used. The change in the deformation amount of the golf ball leads to the difference in distance between the gravity center of the golf ball and the contact point of the ball with the club face. When the ball is harder, the distance between the gravity center and the contact point is larger and if the ball is softer, the distance is shorter. This means that the harder the golf ball, the easier it is to apply spin.

Accordingly, in order to increase the spin amount, it is naturally considered that the ball hardness should be made higher. On the other hand, an increase in the ball hardness makes the shot feel poor. Although it can be possible that the cover of the golf ball is made softer to compensate for the hard shot feel, the resulting golf ball has poor impact resilience and poor initial velocity when hit, thus decreasing the flight distance.

In the present invention, the cover has a Shore D hardness of 55 to 64, preferably 61 to 64 which is slightly lower than that of the conventional two piece solid golf ball. This prevents the ball from becoming too soft which desperately reduces the initial velocity but has a high spin amount. It is also known in the art that the enhancement of the spin performance adversely reduces the launch angle when striking the ball and that the ball is launched lower at first and is then blown up at the end without extending the distance, thus resulting in a poor flight performance. In order to solve the flight performance, the present inventors have found that the dimples formed on a surface of the cover are limited to the diameter of 2 to 5 mm and in number from 300 to 450 preferably 340 to 390. Furthermore, the dimple area proportion of 70±8% of the total surface area and the total dimple volume is 260 to 345 mm$^3$, preferably 280 to 330 mm$^3$. These features of the present invention provide a trajectory with an extended flight distance.

The solid golf ball of the present invention can be either a two piece solid golf ball or a multi-piece solid golf ball in which the core or the cover is made of a plurality of layers. The core and cover can be made from any materials which have been used for golf balls, as long as the golf ball satisfies the features as claimed. Typical examples of the core and cover are hereinafter explained.

The core employed in the solid golf ball of the present invention can be obtained by vulcanizing a rubber composition in a mold. The rubber composition used for the core generally contains a base rubber, a crosslinking agent, a co-crosslinking agent, an inert filler and the like.

The base rubber can be natural rubber or synthetic rubber which has been used for solid golf balls, for example polybutadiene, polyisoprene rubber, styrene-butadiene rubber and EPDM. Preferred is polybutadiene rubber having cis-1,4 structure of at least 40%. The base rubber can be a mixture of the rubbers mentioned above.

The crosslinking agent which is used for the initiating crosslinking reaction can be peroxides, such as dicumyl peroxide and di-t-butyl peroxide. The preferred crosslinking agent is dicumyl peroxide. The amount of the peroxide is not limited but can be 0.5 to 3.0 parts by weight, preferably 0.8 to 1.5 parts by weight, based on 100 parts by weight of the base rubber.

The co-crosslinking agent is used for inserting a crosslinked structure into rubber molecules and can be any one which has been used for solid golf balls. Typical examples of the co-crosslinking agents are metal salt of unsaturated fatty acid, such as one or divalent metal salt of $\alpha,\beta$-unsaturated carboxylic acid having 3 to 8 carbon atoms. The metal includes sodium, potassium, magnesium, zinc and the like, and the $\alpha,\beta$-unsaturated carboxylic acid includes acrylic acid and methacrylic acid. A preferred co-crosslinking agent is zinc acrylate because it imparts high rebound characteristics to the resulting golf ball. The co-crosslinking agent can be present in the rubber composition in an amount of 24 to 38 parts by weight, preferably 28 to 34 parts by weight based 100 parts by weight of the base rubber. Amounts of more than 38 parts by weight make the core too hard and lower the shot feel and amounts of less than 24 parts by weight reduce impact resilience.

The inert filler can be one used for golf balls and includes zinc oxide, barium sulfate, silica, calcium carbonate or zinc carbonate. Generally used is zinc oxide. An amount of the filler is not limited and can vary depending on specific gravity of core and weight regulation of the golf ball, but may be within the range of 10 to 60 parts by weight based on 100 parts by weight of the base rubber.

The rubber composition can contain other components which have been used for cores of golf balls, such as an antioxidant.

The above mentioned components are mixed to form a rubber composition which is then vulcanized at an elevated temperature under pressure in a mold to form a solid core. The vulcanization may be conducted at 130° to 180° C. for 10 to 60 minutes. The solid core of the present invention preferably has a diameter of 37 to 40 mm.

When the core is made of two layers, an inner core is generally made from the above mentioned rubber composition and the outer core can be made from either the above mentioned rubber composition or another thermoplastic resin. The inner core preferably has a diameter of 27.0 to 38.0 mm, more preferably 28.0 to 36.0 mm and the outer layer has a thickness of 0.5 to 6.5 mm, preferably 1.5 to 5.5 mm, so that the total has a diameter of 37 to 40 mm. The core can be made of more than two layers.

The solid core of the present invention preferably has a deformation amount of 2.30 to 3.50 mm, which is determined by applying from an initial load of 10 Kg to a final load of 130 Kg. If it is less than 2.30 mm, the core is too hard. If it is more than 3.50 mm, the core is too soft. The solid core of the present invention preferably has a JIS-C hardness and has a JIS-C hardness distribution within 5. The JIS-C hardness substantially equals to Shore C hardness and is measured according to JIS K 6301.

The solid core obtained above is covered with a cover. The cover can be made from any material which has been used for the covers of golf balls, and typical examples of them are ionomer, polyamide, polyester, and a mixture thereof. Preferred is ionomer resin. Examples of the ionomer resin which is commercially available from Mitsui Du Pont Polychemical Co., Ltd. are ionomer resins such as Hi-milan 1557 (Zn), Hi-milan 1605 (Na), Hi-milan 1650 (Zn), Hi-milan 1707 (Na), Hi-milan AM7318 (Na), Hi-milan 1705 (Zn), Hi-milan 1706 (Zn), Hi-milan 1652 (Zn), Hi-milan AM7315 (Zn), Hi-milan AM7317 (Zn), Hi-milan AM7311 (Mg), Hi-milan MK7320 (K), Hi-milan 8120 (Na); and terpolymer copolymer ionomer resins such as Hi-milan 1856 (Na), Hi-milan 1855 (Zn), Hi-milan AM7316 (Zn), etc. Examples of the ionomer resin which is commercially available from Du Pont Co., U.S.A. include ionomer resins such as Surlyn 8920 (Na), Surlyn 8940 (Na), Surlyn AD8512 (Na), Surlyn 9910 (Zn), Surlyn AD8511 (Zn), Surlyn 7930 (Li), Surlyn 7940 (Li); and terpolymer copolymer ionomer resins such as Surlyn AD8265 (Na), Surlyn AD8269 (Na), etc. Examples of the ionomer resin which is commercially available from Exxon Chemical Co. include Iotek 7010 (Zn), 8000 (Na), etc. In addition, Na, Zn, K, Li, Mg, etc., which are described in parenthesis following the trade name of the above ionomer resin, mean neutralizing metal ion species thereof. The most preferred combination of the ionomer resins is a mixture of 15 to 40% by weight of an ionomer resin having a Shore D hardness of 65 to 68, 20 to 40% by weight of an ionomer resin having a Shore D of 60 to 64 and 30 to 60% by weight of an ionomer resin having a Shore D hardness of 50 to 59; a total weight of the ionomer resins being 100% by weight.

The cover is mainly made from the thermoplastic resin as mentioned above, but may contain a small amount of additives, such as a colorant (e.g. titanium oxide), a UV absorber, a light stabilizer, a fluorescent agent and a fluorescent brightener, as long as the addition of the additives does not deteriorate the desired performance of the golf ball cover.

The method of covering the cover on the solid core is not specifically limited. For example, a method comprising molding a cover composition into a semi-spherical half-shell in advance, covering a core with two half-shells and then subjecting it to a molding pressure at 130° to 170° C. for 1 to 15 minutes, or a method comprising injection molding the cover composition directly on the core to cover the core is used. When molding the cover, dimples may be optionally formed on the cover surface. After molding the cover, paint finishing and stamping may be optionally conducted. The cover may be made of two or more layers, using different cover materials.

According to the present invention, the cover is required to have a Shore D hardness of 55 to 64, preferably 61 to 64. The shore D hardness is measured according to ASTM D-2240. If the cover has a Shore D hardness of less than 54, rebound characteristics are deteriorated and flight distance is poor. If it is more than 64, the controllability of the golf ball is deteriorated and shot feel is also hard. The cover of the solid golf ball of the present invention preferably has a thickness of 1.0 to 4.0 mm, preferably 1.3 to 2.5 mm. If it is more than 4.0 mm, rebound characteristics are poor and flight distance is poor.

The term "dimple area proportion" employed herein means a proportion expressed by percentage wherein the total of an area of a circle formed by an edge 1 of a dimple 2 is divided by the ball surface area calculated from the ball diameter (see FIG. 1). The term "total dimple volume" used herein means the total volume in $mm^3$ of a hollow (oblique line portion 3 in FIG. 1) formed by a plane 4 in touch with the edge 1 of the dimple 2 and an inner wall of the dimple 2. In this context, the term "total" means the sum of the volume of all of the dimples.

The dimple area proportion of the solid golf ball of the present invention is within the range of 62 to 78%. If it is less than 62%, the ball does not extend its flight distance. If it is more than 78%, the ball is liable to fly too high thus and has poor flight distance. The total dimple volume is preferably within the range of 280 to 330 $mm_3$. If it is less than 280 mm$^3$, the ball is liable fly too high and exhibits poor flight distance. If it is more than 330 mm$_3$, the ball does not fly higher and shows poor flight distance.

The size and weight of the solid golf ball of the present invention is adjusted to a suitable range which satisfies golf rules.

EXAMPLES

The following Examples and Comparative Examples further illustrate the present invention in detail but are not to be construed to limit the present invention to their details.

Examples 1–3 and Comparative Examples 1–6
Preparation of core

The ingredients shown in Table 1 were sufficiently mixed and vulcanized into a spherical core having a diameter of 39.1 mm. The vulcanization was conducted as shown in Table 1 in two step and the first step was at 145° C. for 20 minutes and the second step was at 168° C. for 10 minutes. Table 1 shows JIS-C hardnesses at center and on surface and a deformation amount of from 10 Kg to 130 Kg of the core. Comparative Example 6 was an example of commercially available balata covered thread wound golf balls (available from Sumitomo Rubber Industries, Ltd. as Royal Maxfli (black)).

TABLE 1

|  | Examples | | | Comparative Examples | | | | |
| --- | --- | --- | --- | --- | --- | --- | --- | --- |
| Ingredients | 1 | 2 | 3 | 1 | 2 | 3 | 4 | 5 |
| BR-01*$^1$ | 100 | 100 | 100 | 100 | 100 | 100 | 100 | 100 |
| Zinc acrylate | 35 | 31 | 30 | 31 | 35 | 30 | 35 | 31 |
| zinc oxide | 16 | 17.5 | 17.5 | 17.5 | 17 | 18 | 17 | 20 |
| Antioxidant*$^2$ | — | 0.5 | 0.5 | 0.5 | — | — | — | 0.5 |
| Dicumyl peroxide | 1 | 1.2 | 1.2 | 1.2 | 1 | 1 | 1 | 1.2 |
| JIS-C hardness at center | 76 | 77 | 75 | 77 | 76 | 72 | 76 | 77 |
| JIS-C hardness on surface | 79 | 78 | 78 | 78 | 79 | 78 | 79 | 78 |
| Deformation amount of core (mm) | 2.65 | 2.75 | 2.85 | 2.75 | 2.65 | 2.85 | 2.65 | 2.75 |

*$^1$Polybutadiene rubber having a cis-1,4 content of 97%, available from Japan Synthetic Rubber Co., Ltd.
*$^2$Available from Ouchi Shinko Kagaku K.K.

Preparation of golf ball

The ingredients shown in Table 2 was mixed and injection-molded onto the core obtained above to form a cover layer. Shore D hardness and cover thickness of each cover were determined and the result are shown in Table 2.

TABLE 2

|  | Examples | | | Comparative Examples | | | | |
| --- | --- | --- | --- | --- | --- | --- | --- | --- |
|  | 1 | 2 | 3 | 1 | 2 | 3 | 4 | 5 |
| Hi-milan 1707*$^3$ | 30 | — | 20 | — | 30 | — | 30 | — |
| Hi-milan 1706*$^4$ | — | 30 | — | 30 | — | 50 | — | — |
| Hi-milan 1557*$^5$ | — | 30 | 30 | 30 | — | — | — | — |
| Hi-milan 1855*$^6$ | 40 | 40 | 50 | 40 | 40 | — | 40 | — |
| Hi-milan 1652*$^7$ | — | — | — | — | — | — | — | 50 |
| Hi-milan 1650*$^8$ | 30 | — | — | — | 30 | — | 30 | — |
| Hi-milan 8120*$^9$ | — | — | — | — | — | — | — | 50 |
| Hi-milan 1605*$^{10}$ | 30 | — | — | — | 30 | 50 | 30 | — |
| Shore D hardness | 61 | 62 | 61 | 62 | 61 | 68 | 61 | 53 |

TABLE 2-continued

|  | Examples | | | Comparative Examples | | | | |
| --- | --- | --- | --- | --- | --- | --- | --- | --- |
|  | 1 | 2 | 3 | 1 | 2 | 3 | 4 | 5 |
| Cover thickness (mm) | 1.6 | 1.9 | 2.4 | 1.9 | 2.1 | 2.1 | 2.1 | 4.5 |

*$^3$Ionomer resin neutralized with Na, available from Mitsui DuPont Chemical Co., Ltd.
*$^4$Ionomer resin neutralized with Zn, available from Mitsui DuPont Chemical Co., Ltd.
*$^5$Ionomer resin neutralized with Zn, available from Mitsui DuPont Chemical Co., Ltd.
*$^6$Ionomer resin neutralized with Zn, available from Mitsui DuPont Chemical Co., Ltd.
*$^7$Ionomer resin neutralized with Zn, available from Mitsui DuPont Chemical Co., Ltd.
*$^8$Ionomer resin neutralized with Zn, available from Mitsui DuPont Chemical Co., Ltd.
*$^9$Ionomer resin neutralized with Na, available from Mitsui DuPont Chemical Co., Ltd.
*$^{10}$Ionomer resin neutralized with Na, available from Mitsui DuPont Chemical Co., Ltd.

Dimples were formed as the cover was injection-molded. Number of dimples, dimple area proportion and total dimple volume were measured and calculated and the result are shown in Table 3.

The resulting solid golf balls were subjected to the evaluation of ball weight, ball deformation amount, ball initial velocity when hit by a driver, flight distance when hit by a driver, spin amount when hit by a driver, height of trajectory (launch angle), spin amount when hit by a sand wedge and controllability of approach shot conducted by professional golfers, and the results are shown in Table 3.

Ball deformation amount: A deformation of a golf ball when applying from an initial load of 10 Kg to a final load of 130 Kg.

Initial velocity, flight distance, spin amount and launch angle A golf club was attached to a swing robot available from True Temper Co. and golf balls were hit. When a driver (No. 1 wood available from Callaway Co.. as Great Big Birtha) was used, its head speed was 45 m/second, and when a sand wedge (available from Callaway Co.. as Big Birtha Iron) was used, its head speed was 20 m/second. In case of the driver, a flight distance was determined from the hit point to the point where the ball firstly reached on the ground. Spin amount, initial velocity and lauch angle were determined by a photograph which was taken immediate after hitting the golf ball.

Controllability at approach shot: 10 professional golfer hit golf balls. The approach shot was a shot toward a green from a distance of 10 to 70 yards, using a sand wedge. Evaluation is as follow.

Excellent=Stop on the green very good

Good=Stop on the green a little

Fairly good=Ordinary

Poor=Difficult to stop on the green

|  | Examples | | | Comparative Examples | | | | | |
|---|---|---|---|---|---|---|---|---|---|
|  | 1 | 2 | 3 | 1 | 2 | 3 | 4 | 5 | 6 |
| Number of dimples | 342 | 360 | 372 | 360 | 286 | 480 | 432 | 360 | 432 |
| Dimple area proportion (%) | 70 | 72 | 66 | 62 | 55 | 82 | 76 | 72 | 78 |
| Total dimple volume (mm³) | 305 | 300 | 295 | 310 | 295 | 305 | 275 | 300 | 330 |
| Ball weight (g) | 45.3 | 45.4 | 45.3 | 45.4 | 45.3 | 45.3 | 45.5 | 45.3 | 45.3 |
| Ball deformation amount (mm) | 2.5 | 2.5 | 2.55 | 2.5 | 2.4 | 2.3 | 2.4 | 2.3 | — |
| Initial velocity of ball (m/sec) | 65.5 | 65.4 | 65.6 | 65.4 | 65.5 | 66.1 | 65.6 | 64.1 | — |
| Flight distance by driver (yards) | 221.5 | 221.7 | 221.0 | 219.3 | 218.7 | 22.1 | 217.5 | 217.9 | — |
| Spin amount by driver (rpm) | 3200 | 3250 | 3150 | 3250 | 3200 | 3080 | 3400 | 3450 | — |
| Lauch angle (°) | 14.2 | 14.4 | 14.3 | 13.9 | 14.1 | 13.9 | 15.8 | 14.2 | — |
| Spin amount by sand wedge (rpm) | 5700 | 5500 | 5650 | 5500 | 5750 | 4400 | 5700 | 5350 | 5800 |
| Controllability at approach | Excellent | Excellent | Excellent | Excellent | Excellent | Poor | Good | Fairly good | Excellent |

The solid golf ball of Comparative Example 3 has a Shore D hardness of 68 in cover and many dimples on the surface. The golf ball belongs to the conventional two piece solid golf ball. The solid golf balls of Examples 1 to 3 have a little lower initial velocity than the ball of Comparative Example 3, but its flight performance nearly equals to the conventional golf ball. The other properties, i.e. spin performance and controllability at approach of Examples 1 to 3, are superior to Comparative Example 3.

The golf ball of Comparative Example 1 has a lower dimple area proportion and therefore shows poor flight distance.

The golf ball of Comparative Example 2 has a less number of dimples and therefore shows poor flight distance.

The golf ball of Comparative Example 4 has a higher dimple area proportion and is liable to be blown up, thus not extending flight distance.

The golf ball of Comparative Example 5 has a thicker cover layer and a lower cover hardness, and therefore has a lower initial velocity and poor flight distance.

What is claimed is:

1. A solid golf ball having a good flight performance and a good spin performance comprising a solid core and a cover covering said core, wherein said core is formed from a rubber composition comprising a polybutadiene rubber having a cis-1,4-structure content of at least 40% and either an unsaturated carboxylic acid or a metal salt thereof or the both, and the cover has a thickness of 1 to 4 mm, a Shore D hardness of 55 to 64 and has 300 to 450 dimples having a diameter of 2 to 5 mm, and the dimples have a dimple area proportion of 62 to 78% and a total dimple volume of 260 to 345 mm³.

2. The solid golf ball according to claim 1, wherein said core has a deformation amount of from 2.30 to 3.50 mm by applying a load of from 10 Kg load to 130 Kg.

3. The solid golf ball according to claim 2, wherein said core has a JIS-C hardness of 50 to 85 and a JIS-C hardness distribution within 5.

4. The solid golf ball according to claim 2, wherein said cover is formed from a mixture of 15 to 40% by weight of an ionomer resin having a Shore D hardness of 65 to 68, 20 to 40% by weight of an ionomer resin having a Shore D of 60 to 64 and 30 to 60% by weight of an ionomer resin having a Shore D hardness of 50 to 59; a total weight of the ionomer resins being 100 by weight.

5. The solid golf ball according to claim 1, wherein said core has a JIS-C hardness of 50 to 85 and a JIS-C hardness distribution within 5.

6. The solid golf ball according to claim 5, wherein said cover is formed from a mixture of 15 to 40% by weight of an ionomer resin having a Shore D hardness of 65 to 68, 20 to 40% by weight of an ionomer resin having a Shore D of 60 to 64 and 30 to 60% by weight of an ionomer resin having a Shore D hardness of 50 to 59; a total weight of the ionomer resins being 100% by weight.

7. The solid golf ball according to claim 1, wherein said cover is formed from a mixture of 15 to 40% by weight of an ionomer resin having a Shore D hardness of 65 to 68, 20 to 40% by weight of an ionomer resin having a Shore D hardness of 60 to 64 and 30 to 60% by weight of an ionomer resin having a Shore D hardness of 50 to 59; the total weight of the ionomer resins being 100% by weight.

8. The solid golf ball of claim 1, wherein the rubber composition contains a crosslinking agent in an amount of 0.5 to 3.0 parts by weight based on 100 parts by weight of the base rubber.

9. The solid golf ball of claim 8 wherein the rubber composition contains a co-crosslinking agent in an amount of 24 to 38 parts by weight based on 100 parts by weight of the base rubber.

10. The solid golf ball of claim 1, wherein the total dimple volume is 280 to 300 mm³.

11. The solid golf ball of claim 1, wherein the ball weight is 45.3 to 45.4 g.

* * * * *